Patented Aug. 4, 1942

2,292,097

UNITED STATES PATENT OFFICE 2,292,097

WINDOW FOG AND FROST PREVENTIVE COMPOSITION

Leslie W. Vollmer, Pittsburgh, Pa., assignor to Gulf Research & Development Company, Pittsburgh, Pa., a corporation of Delaware No Drawing. Application August 25, 1937, Serial No. 160,938

11 Claims. (Cl. 106—13)

This invention relates to liquid fog and frost preventive compositions; and it comprises a liquid composition for application to windows and the like to provide thereon a clear, clinging film, unaffected by atmospheric acids and capable of absorbing condensed water with preservation of uniform transparent liquid characteristics, said composition comprising an aqueous solution of a non-volatile acid-resisting wetting agent, such as a soluble salt of a sulfuric acid derivative carrying a chain of 8 to 18 carbon atoms and of sufficient acid strength to prevent displacement by atmospheric $CO_2$; said composition usually also containing in solution a volatile organic solvent, and sometimes containing an additional water-soluble liquid substance for lowering the freezing point of the condensed moisture; all as more fully hereinafter set forth and as claimed.

In the art to which this invention relates it has heretofore been suggested to prevent the formation of fog on transparent materials such as glass windows or on polished reflecting surfaces such as mirrors or polished metals by the application to such surfaces of solutions containing a substance adapted to cause coalescence of the fog droplets into a continuous, clear film, by lowering the surface tension of water condensing on the surface. In establishing and maintaining satisfactory liquid films for preventing fogging and frosting of wind-shields and show windows, there are certain desiderata for the liquid. It must have sufficient viscosity to form a clinging vertical film; it must neither freeze nor dry up with deposition of insoluble matter; it must be able to take up moderate amounts of dew and frost without changing and with formation of a clear film and it must be unaffected by the acid gases in the atmosphere, $CO_2$ and sometimes $SO_2$.

For the most part, in the prior art, aqueous solutions of ordinary soaps, sodium compounds of fatty acids, have been used. Fatty acid salts of potassium and organic bases are less often used. Fatty acids are weak acids and it is difficult to make a clear aqueous solution without dissociation and production of turbidity; development of turbidity being accentuated by the $CO_2$ of the atmosphere. An aqueous solution of soap on glass in thin films is temporarily effective in forming continuous films of any water condensed on the surface to which they are applied, but they quickly become unsatisfactory because the deposited soap film is rapidly decomposed by acid gases normally present in the atmosphere; for example, carbon dioxide and sulfur dioxide. Atmospheric $CO_2$ and the strong acids sometimes present in the air in industrial localities act to liberate free fatty acids from any soap present on the surface to be protected, with the result that it is soon in worse condition than originally. The presence of a free fatty acid promotes fog formation instead of preventing it. This objectionable feature of fatty acid soaps defeats the object of lowering the surface tension of drops of water.

According to the present invention there is provided a fog or frost preventive composition, suitable for application to windows, etc., in the form of an aqueous solution of a suitable acid resistant wetting agent. The liquid when applied to the window forms an adherent film of uniform transparency, and upon condensation of water, the water is taken up by the film, which preserves its transparency and adherence.

I have discovered that aqueous solutions of salts of certain relatively strong acids carrying a long carbon chain are effective in producing liquid films of good clarity, wetting glass readily to produce clinging permanent films even on vertical surfaces.

The best wetting agents for my purposes belong to the class of non-volatile soluble salts of sulfuric acid derivatives containing continuous chains of 8 to 18 carbon atoms, and free of carboxyl groups. Fatty acid soaps are ruled out, for the reasons given. More particularly within the above category I find an advantageous class of compounds to be the alkali, ammonium and organic base salts of high molecular weight aliphatic bodies containing as substituents sulfuric or sulfonic groups of acid character. Sulfuric acid reacts with alcohols to form "half esters;" one H being replaced by an alkyl group. These half esters are strong monobasic acids giving sodium salts not decomposed by $CO_2$. The sulfonated compounds are quite similar in character, being also strong monobasic acids, but their structure is different, an alkyl radical replacing .OH of the sulfuric acid instead of H. The alkali, ammonium and amine salts of sulfated high molecular weight alcohols are very effective in reducing the surface tension of water. These salts and mixtures thereof are marketed under the trade name "Gardinol." They are not decomposed by carbon dioxide or even stronger mineral acids. In speaking of sulfated high molecular weight alcohols, I include either the half esters or the sulfonic acids formed by the action of strong sulfuric acid on any of the normal or primary aliphatic alcohols carrying between 8 and 18 carbon atoms; and the neutral salts thereof. For example, such a substance as sodium lauryl sulfate $C_{12}H_{25}NaSO_4$ is effective in reducing the surface tension of water and causing the formation of a clear film while at the same time this salt is not decomposed by carbon dioxide or stronger acids. Being non-volatile, and being unattacked by acids in the atmosphere it forms permanent films, when in water solution.

A class of compounds suitable for the purpose described are alkali, ammonium and organic base salts of sulfuric acid derivatives containing aliphatic radicals of 8 to 18 carbon atoms. In some cases, the carbon chain attached to the acid group as an entirety is not continuous but carries an intermediate amido group, but in all cases the chain contains 8 to 18 carbon atoms linked in a continuous chain. Compounds of this type being marketed under the trade name "Igepon" are suitable. As a representative compound in this class, I cite the sodium salt of oleic N-methyl tauride ($C_{17}H_{33}$—CO—N($CH_3$)—$C_2H_4$—$SO_3Na$).

For convenience in application, I find it advantageous to provide a solution in a relatively volatile solvent of such a wetting agent as has been described. So doing, the material may be deposited on a smooth surface in a very thin transparent film, which is all that is required in order for it to function effectively.

It is desirable to apply my composition to a clean surface in order that it may function most effectively. A water solution of an alkali, ammonium, or organic base salt of a sulfated or sulfonated high molecular weight aliphatic body is an excellent cleaning agent in itself and where the surface to which it is to be applied is dirty or greasy, such surface may be thoroughly cleansed by a first application followed, if necessary, by a second application to form a film of fog-preventing material. The composition may be applied to the surface to be protected with a cloth or the like in the usual manner.

In one specific embodiment of the invention I prepared a fog preventive composition by dissolving in 16 quarts of distilled water and 4 quarts of a mixture of ethyl alcohol and acetone in relative volumetric proportions of 10:1 respectively, one pound of a mixture of sodium salts obtained by treating a mixture of primary normal aliphatic alcohols of between 8 and 18 carbon atoms with strong sulfuric acid and neutralizing the sulfuric esters so derived with caustic alkali. The mixture of aliphatic alcohols referred to above, is obtained by reductiton of mixed fatty acids from various fatty oils of commerce; for example, cocoanut, palm kernel and sperm oils. Mixtures of salts of the type I employ are well-known articles of commerce and for the purpose of this invention I find them economical and satisfactory.

When it is desired to prevent frost formation as well as fog formation, for instance under conditions such that the prevailing temperatures of the surface to be protected are apt to be substantially below 32° F., I sometimes add to the above liquid composition any clear, non-volatile liquid miscible therewith and adapted to lower the freezing point of water solutions. For example, in cold weather I find it expedient to add to a composition prepared according to the above formula 12 quarts of glycerine or in lieu thereof an equivalent amount of ethylene glycol or another material which is clear and non-volatile and acts to lower the freezing point of water solutions.

In other specific embodiments, I have prepared compositions of effectiveness equal to those containing other alkali sulfates of high molecular weight alcohols by substituting therefor in equal amounts the sodium salt of oleic N-methyl tauride.

In the compositions described above, the alcohol-acetone mixture assists in forming a clear solution of wetting agent in the water vehicle, it promotes rapid evaporation of the carrying liquid so that a film of the sulfated aliphatic body is quickly deposited on the surface and it assists in removal of grease from any surface to which the solution is applied. In lieu of the alcohol-acetone mixture there may be used in the composition alcohol or acetone alone or any low molecular weight, water-soluble alcohol such as methyl alcohol, isopropyl alcohol or normal propyl alcohol or a water-soluble ketone or a mixture of these. Any of the well-known volatile and water-soluble solvents may be employed. The alcohol-acetone mixture described is particularly useful in preventing the composition from clouding at low temperatures, whereby the appearance of the composition is kept uniform under widely varying temperature conditions.

The solubility in water of the compounds here in question is not indefinitely great and in mixing with water, there may be an initial milkiness. This disappears on further dilution or on absorption of water by a film in place on a glass surface. In the end, the solution is wholly transparent. But it is better to make a clear solution in the first place, as it has, for one thing, a more attractive appearance. I often add perfume or dye in slight amount.

What I claim is:

1. An aqueous liquid composition for preventing fog on windows and the like, adapted to adhere to glass and to film out condensed water as a clear transparent layer unaffected by $CO_2$, said composition containing a non-volatile acid resistant wetting agent characterized by being a soluble salt of a sulfuric acid derivative having an aliphatic radical free of carboxyl groups, which radical comprises a continuous aliphatic chain of from 8 to 18 carbon atoms.

2. A composition of matter according to claim 1 in admixture with an additional clear non-volatile liquid substance adapted to lower the freezing point of condensed water forming said surface film.

3. A composition according to claim 1 wherein said non-volatile acid resistant wetting agent is selected from the class consisting of alkali metal, ammonium and organic base salts of sulfated high molecular weight alcohols.

4. The composition of claim 1 wherein said non-volatile wetting agent is a mixture of sodium salts of mixed sulfated alcohols of between 8 and 18 carbon atoms.

5. A composition according to claim 1 wherein said acid resistant non-volatile wetting agent is selected from the class consisting of alkali metal, ammonium and organic base salts of sulfated and substituted amides containing aliphatic radicals of between 8 and 18 carbon atoms.

6. The composition of claim 10 wherein said non-volatile acid resistant wetting agent is oleic N-methyl tauride.

7. As a window fog preventive a water solution of an alkali salt of a sulfated high molecular weight alcohol containing a more volatile water-soluble organic solvent.

8. As a window fog preventive a water solution of an alkali salt of a sulfated high molecular weight alcohol containing a substantial amount of a volatile water-soluble organic solvent consisting of alcohol and acetone in relative volumetric proportions of approximately 10:1.

9. As a window fog preventive a composition containing the following ingredients in substantially the proportions stated:

| | |
|---|---:|
| Sodium salts of mixed sulfated alcohols of between 8 and 18 carbon atoms__pounds__ | 1 |
| Distilled water _____quarts__ | 16 |
| Acetone _____do____ | .4 |
| Ethyl alcohol _____do____ | 3.6 |

10. An aqueous liquid composition for preventing fog on windows and the like, capable of causing condensed water to film out as a clear transparent layer unaffected by the presence of $CO_2$, comprising an aqueous solution of a soluble sulfuric acid derivative corresponding to the formula

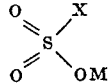

in which X denotes a group selected from the class consisting of R and OR wherein R is an aliphatic radical free from carboxyl groups and carboxyl salts and containing a chain of from 8 to 18 carbon atoms, and in which formula M denotes a substance selected from the class consisting of alkali metals, $NH_4$ and organic base groups.

11. An aqueous liquid composition for preventing fog on windows and the like, adapted to adhere to glass and to film out condensed water as a clear transparent layer unaffected by $CO_2$, said composition comprising a non-volatile acid-resistant wetting agent characterized by being a soluble salt of a sulfuric acid derivative having an aliphatic radical free of carboxyl groups which radical comprises a continuous aliphatic chain of 8 to 18 carbon atoms; a low-molecular-weight, volatile, water-soluble organic solvent to prevent clouding of the composition at low temperatures; and water.

LESLIE W. VOLLMER.

CERTIFICATE OF CORRECTION.

Patent No. 2,292,097.  August 4, 1942.

LESLIE W. VOLLMER.

It is hereby certified that error appears in the printed specification of the above numbered patent requiring correction as follows: Page 2, second column, line 67, claim 6, for the claim reference numeral "10" read --1--; and that the said Letters Patent should be read with this correction therein that the same may conform to the record of the case in the Patent Office.

Signed and sealed this 15th day of September, A. D. 1942.

Henry Van Arsdale,
Acting Commissioner of Patents.

(Seal)